United States Patent [19]

Emerson

[11] 4,037,467

[45] July 26, 1977

[54] FUEL INJECTOR TESTING APPARATUS

[75] Inventor: Reginald Stanley Emerson, Buckingham, England

[73] Assignee: Leslie Hartridge Limited, England

[21] Appl. No.: 732,707

[22] Filed: Oct. 15, 1976

[30] Foreign Application Priority Data

Oct. 17, 1975 United Kingdom ............... 42668/75

[51] Int. Cl.² ........................................... G01M 15/00

[52] U.S. Cl. ................................................. 73/119 A

[58] Field of Search ..................... 73/119 A, 168, 49.7

[56] References Cited

U.S. PATENT DOCUMENTS

| | | | |
|---|---|---|---|
| 2,517,766 | 8/1950 | Cole | 73/119 A X |
| 2,629,255 | 2/1953 | Hartridge | 73/119 A |

*Primary Examiner*—Jerry W. Myracle
*Attorney, Agent, or Firm*—Berman, Aisenberg & Platt

[57] ABSTRACT

Apparatus for testing fuel injectors having their own in-built high pressure pump, the said apparatus comprising: removable motion-transmitting means adapted to engage and actuate the high pressure pump of an injector to be tested on the apparatus, driving means comprising a cam-shaft and a motor driving said cam-shaft for imparting motion to said motion-transmitting means, a fuel-collecting nose assembly to receive the nozzle end of an injector to be tested, and an hydraulic clamp for engaging and thus clamping the nozzle end of the injector into the said fuel-collecting nose assembly, the said motion-transmitting means serving also as a positioning means for positioning an injector when the latter is fitted on the apparatus for testing.

12 Claims, 13 Drawing Figures

232
236
78
240
238
242
244
234
246
252
248
250
218
216
214
226
220
222
230
224
228

FUEL INJECTOR TESTING APPARATUS

This invention relates to apparatus for testing fuel injectors used in Diesel engines.

In British Pat. No. 1,185,897 there is described apparatus for testing fuel injectors of the kind which incorporate their own high pressure pump. The present invention is likewise concerned with apparatus for testing that kind of injector and is directed to improvements which make the apparatus particularly suitable or use by the manufacturers of fuel injectors and by service agencies whose responsibility it is to service such fuel injectors at regular intervals during normal use of the latter in Diesel engines.

According to the invention, apparatus for testing fuel injectors having their own in-built high pressure pump comprises removable motion-transmitting means adapted to engage and actuate the high pressure pump of an injector to be tested on the apparatus, driving means comprising a cam-shaft and a motor driving said cam-shaft for imparting motion to said motion-transmitting means, a fuel-collecting nose assembly to receive the nozzle end of an injector to be tested, and an hydraulic clamp for engaging and thus clamping the nozzle end of the injector into the said fuel-collecting nose assembly, the said motion-transmitting means serving also as a positioning means for positioning an injector when the latter is fitted on the apparatus for testing.

Preferably the apparatus comprises a motor-driven cam-shaft having a removable cam, a cam follower, a removable extension stem for transmitting rotary motion of the cam to a pumping piston of an injector under test so as to cause the latter to pump fuel, an adapter for locating the body part of the injector with respect to a platform of the apparatus, an hydraulic clamp for bringing the injector body and the extension stem into their correct positions with respect to each other, a second hydraulic clamp associated with the platform arranged to engage the nozzle or delivery end of the injector and bring the injector body into a correct relationship with the Platform, and further hydraulic means for returning the clamps to their initial positions.

Several advantages are given by apparatus of this construction. In the first place, the use of a removable cam means that different sizes of injector cann all be tested on one and the same apparatus simply by fitting the correct cam for a particular injector on the cam-shaft before testing of the injector is begun. Similarly, the use of a removable extension stem for transmitting reciprocating motion of the cam follower to the injector means that a wide variation in overall length from injector type to injector type can be accommodated with the minimum range of clamp cylinder stroke. It also enables the volume (and therefore the resilience) of hydraulic fluid in the clamp cylinder to be maintained constant for all types of injector by selecting the appropriate extension stem for that injector. Another advantage is that the use of two hydraulic clamps allows the injector to be correctly positioned with respect to the selected cam on the cam-shaft independently of the clamping of the nozzle or delivery end of the injector into a fuel-collecting socket.

An example of apparatus in accordance with the invention in shown in the accompanying drawings, in which.

Figure 1:
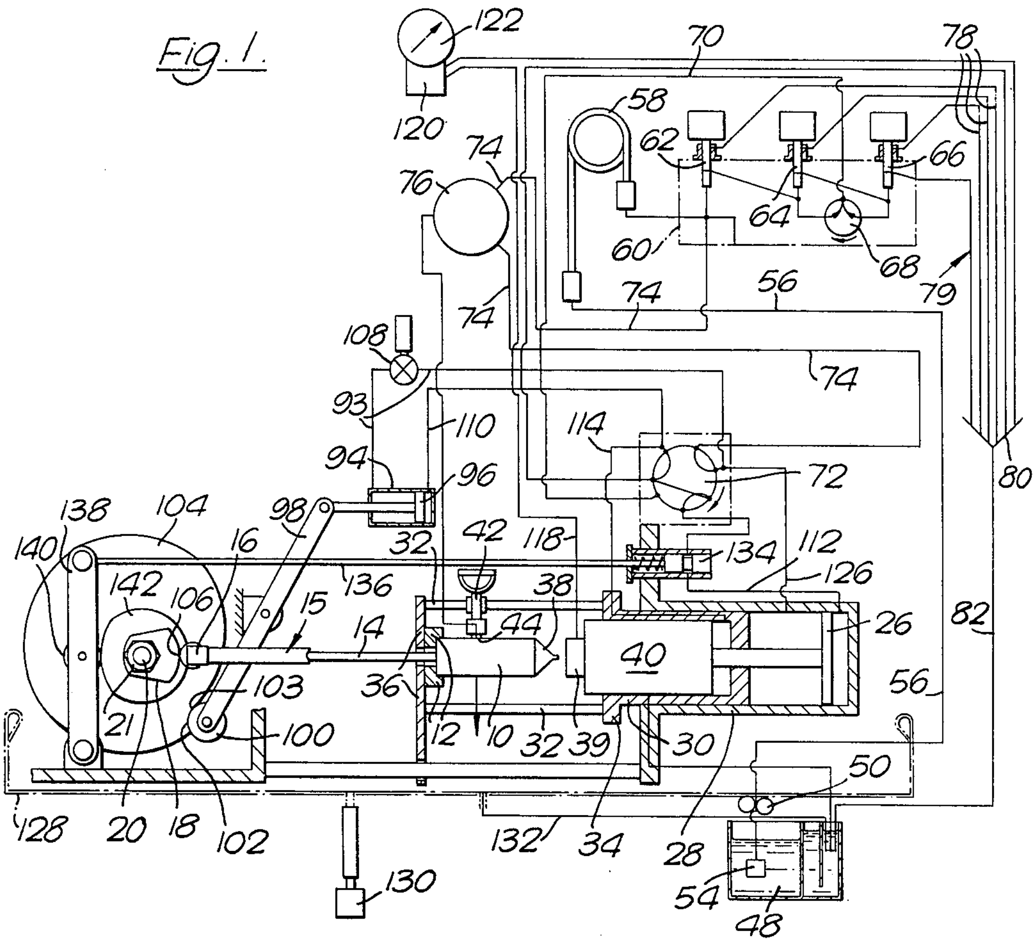
FIG. 1 is a diagrammatic view of the apparatus as a whole.

As already indicated, the apparatus shown in the drawings is for testing fuel injectors as used in Diesel engines, the injectors being of the kind having their own high pressure pump. The particular apparatus shown in designed especially for use by services agencies who are appointed by an injector manufacturer to service injectors which are in regular use. However, with the addition of certain refinements, such as transducers not shown in the drawings, such apparatus can also be used by injector manufacturers to test injectors before they leave the factory.

Figure 4:
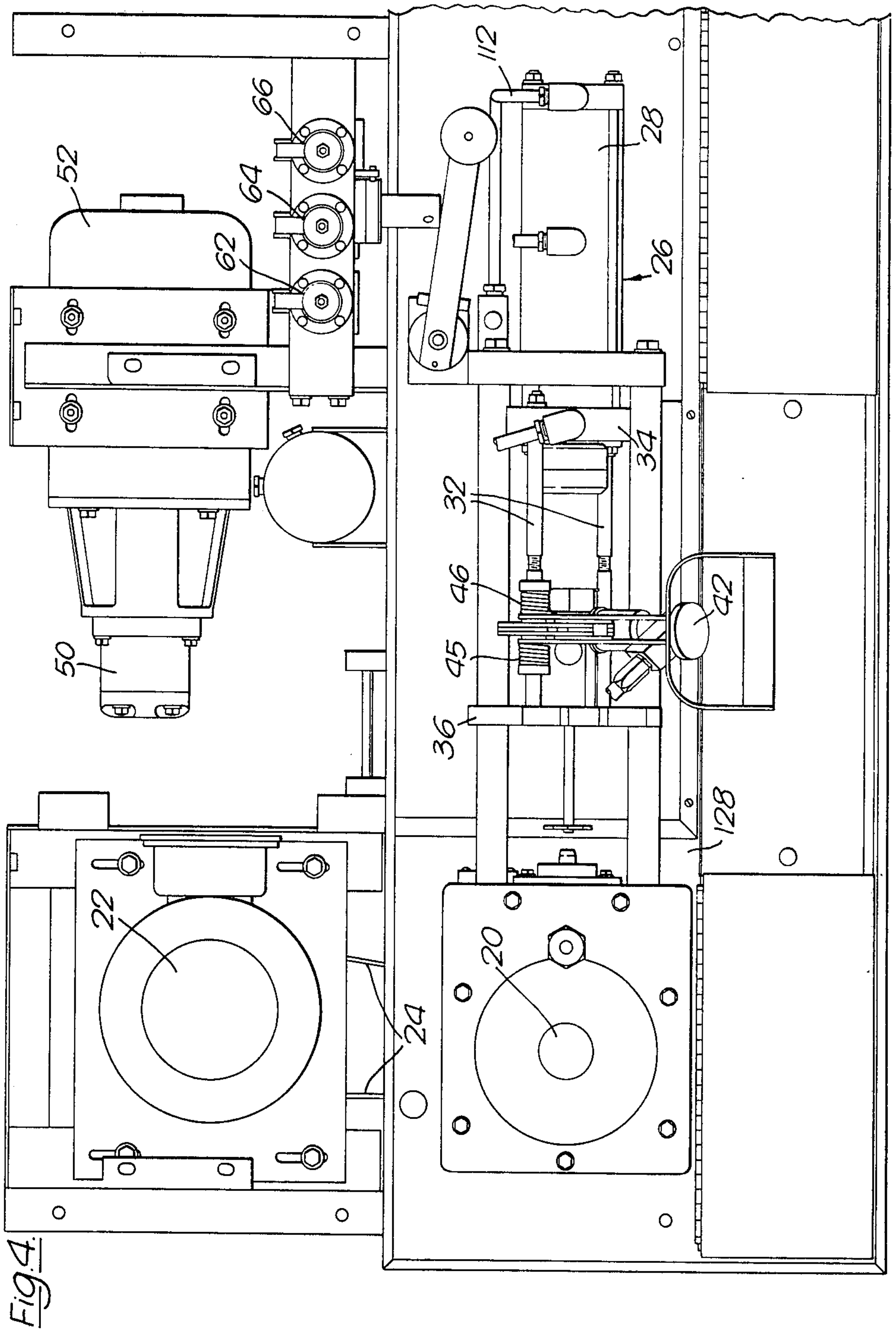
FIG. 4 is a plan view from above of the main parts of the apparatus.
Figure 5:
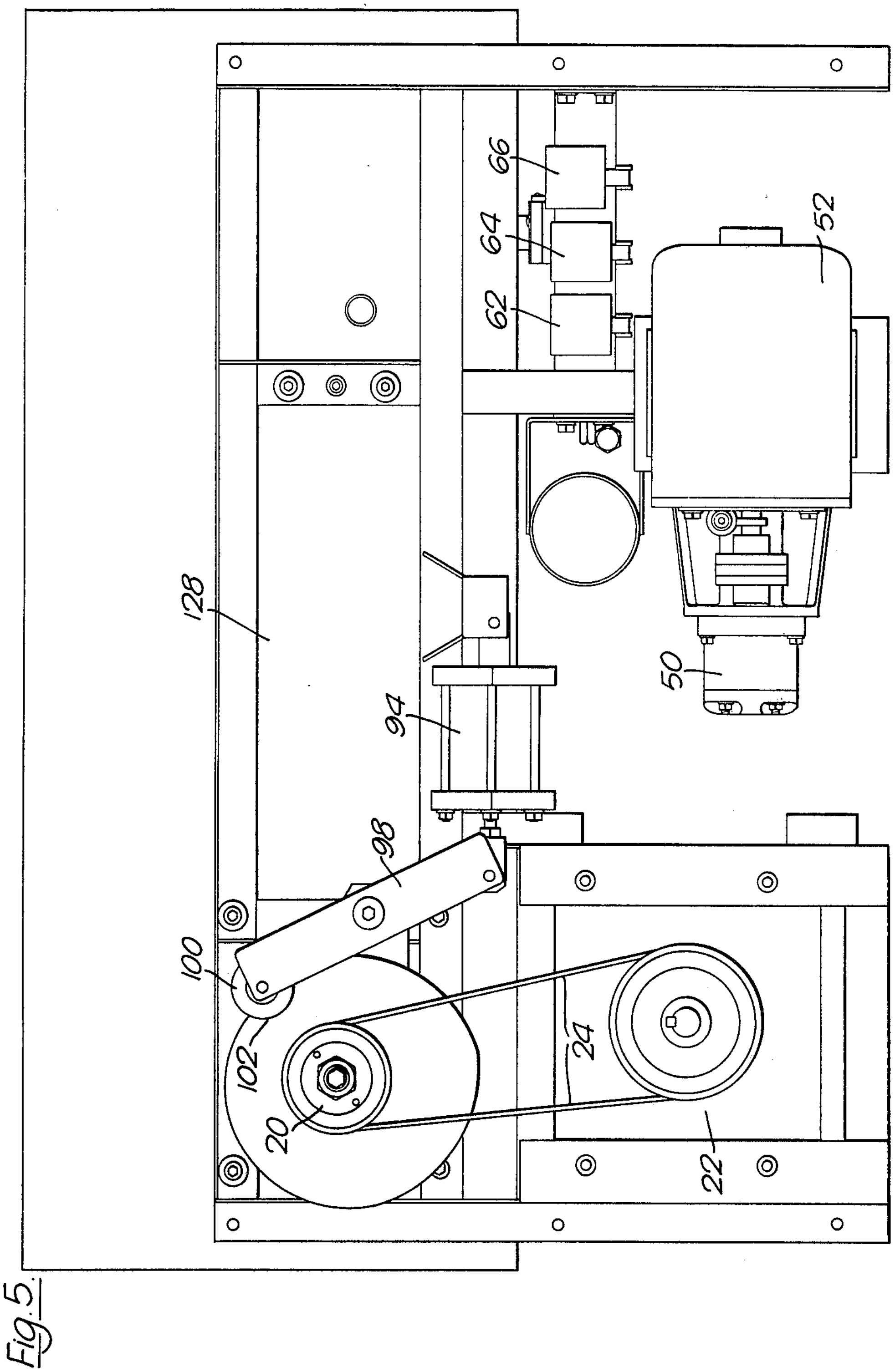
FIG. 5 is a plan view from below of the same main parts.
Figure 6:
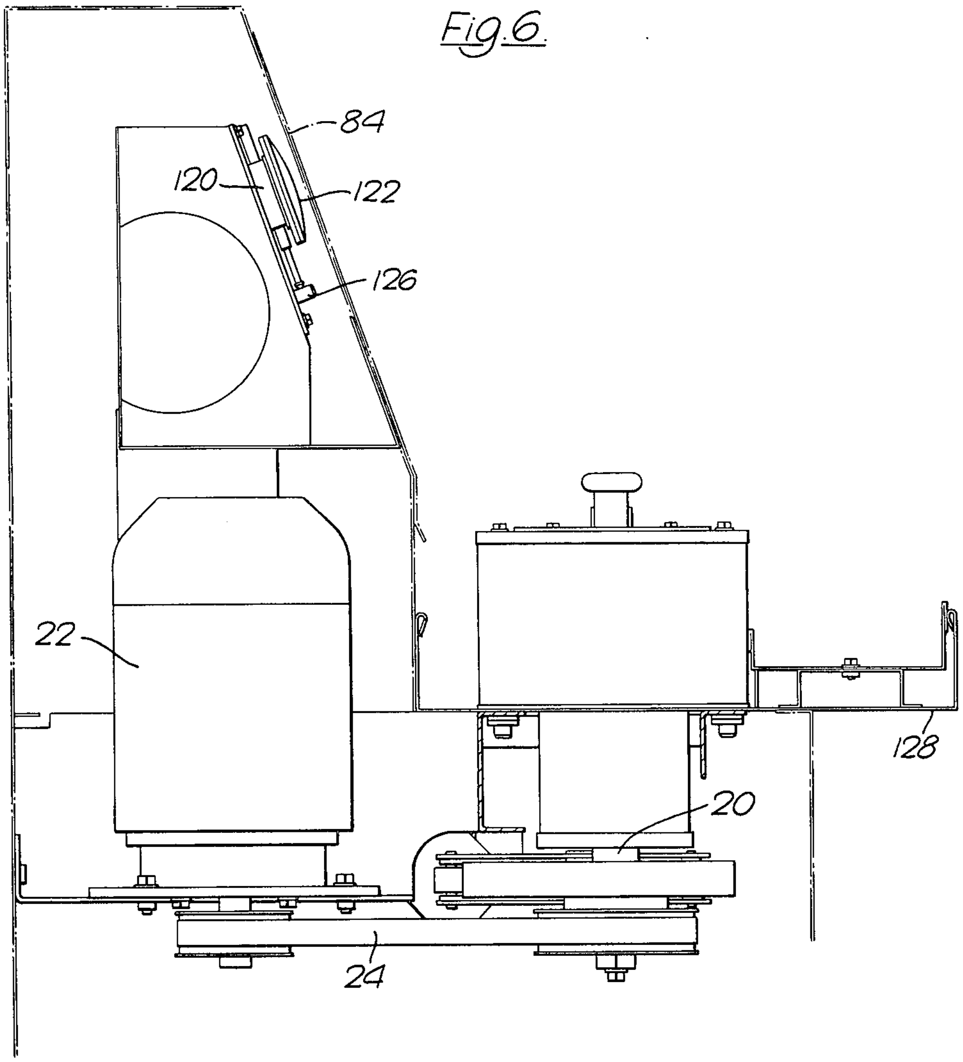
FIG. 6 is a view of one end of the said main parts.

FIG. 1 shows an injector 10 which has been inserted in the apparatus so that it (the injector) can be tested. The high pressure pump within the injector needs to be actuated by reciprocating the pump to deliver fuel from its nozzle, and an extension stem 14 is provided for this purpose on the apparatus. One end of the stem 14 engages the piston (not shown) of the injector pump at its rear end, while the other end engages a cam follower 15 having a roller or wheel 16 which bears on the peripheral surface of a cam 18 carried on a cam shaft 20, the cam 18 being releasably locked on the shaft by a locking nut 21. The shaft 20 is driven by an electric motor 22 (see FIGS. 4, 5 and 6) through a belt 24.

The injector 10 and the extension stem 14 are brought into their correct positions with respect to each other and with respect to the cam 18 by an hydraulic clamp 26 comprising a stationary cylinder 28, a hollow piston 30 slidingly mounted in the cylinder, two or more bars or rods 32 extending in parallel from a flange 34 on an external part of the piston 30, and a platform member 36 which can carry a range of annular adapters 12 for accommodating the various types of injector 10. The reason for using a hollow piston 30 is that it allows a second hydraulic clamp 40 to be formed within a hollow piston 30 for engaging the thus clamping the nozzle or delivery end 38 of the injector 10 into a fuel-collecting socket 39 independently of the function of the clamp piston 26.

Figure 9:
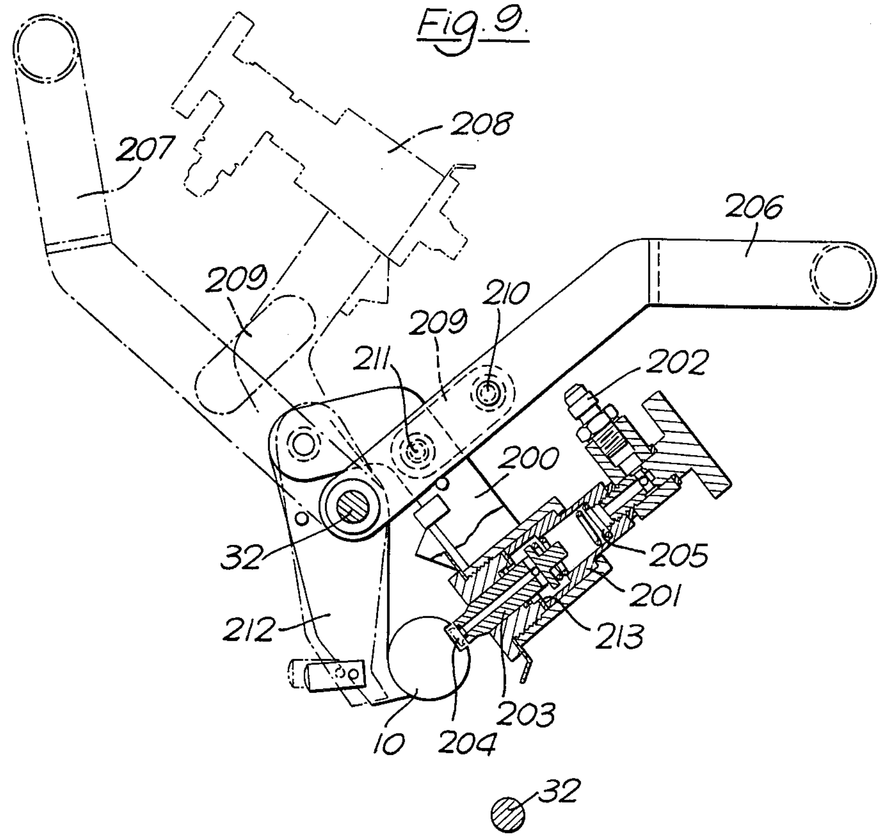
FIG. 9 is an enlarged vertical section through part of the apparatus shown in FIG. 4.

The supply of fuel to the injector to allow it to be tested is effected through a fuel arm assembly 42 which is mounted for swinging movement on one of the rods 32 as shown in FIG. 9. The fuel arm 200 carries a chamber 201 fed with fuel by a pipe 202. A valve 203 makes sealing contact with an injector inlet 204 under the action of a spring 205. With no injector fitted, a handle 206 is in position 207 and the arm 200 is in position 208. After fitting the injector 10, the handle 206 is brought downwards which, by means of a link 209, brings the valve 203 into sealing contact with the injector inlet 204 by which time pivots 210 and 211 are in line with the bar 32, thus producing a reaction on the injector and locking the arm 200 in position. On engaging the injector inlet 204, the valve 203 is pushed, against the action of the spring 205, into its fuel-suppling position. The arm 212 applies an equal and opposite force to the other side of injector 10 so as to avoid any side load to the injector. On releasing the assembly, the spring 205 pushes the head of the valve 203 into sealing contact with an abutment 213 and shuts off the fuel.

Springs 45 and 46 (see FIG. 4) serve to prevent the handle 206 falling down and also to move the lever 212 away from the injector body 10 when the handle 206 is lifted. In addition, means adjacent the springs 45 and 46 serve to hold the fuel arm assembly 42 against undesirable lateral movement. This is important from the point of view of ensuring proper engagement of the valve 203 with the injector inlet 204.

Fuel for feeding to the fuel arm 42 and also for use as hydraulic fluid in the two hydraulic clamps described above is contained in a fuel tank 48. A gear pump 50 driven by an electric motor 52 (see FIGS. 4 and 5) draws fuel from the tank 48 through a filter 54 and delivers it via a pipe line 56 to a pulsation damper 58 which damps out the pump pulses by making the fuel pass through a coiled tube. To assist this damping of the pump pulses, both the pipe line 56 and the coiled tube forming the damper 58 are made of nylon or some other synthetic plastics material so that they yield to some extent on the application of internal pressure. After passing through the pulsation damper 58, the fuel goes to a manifold block 60 having three deadweight piston valves 62, 64 and 66 each provided with a dashpot. These valves are identical — apart from the weights applied to them — and their construction will now be described with reference to FIG. 12.

Figure 12:
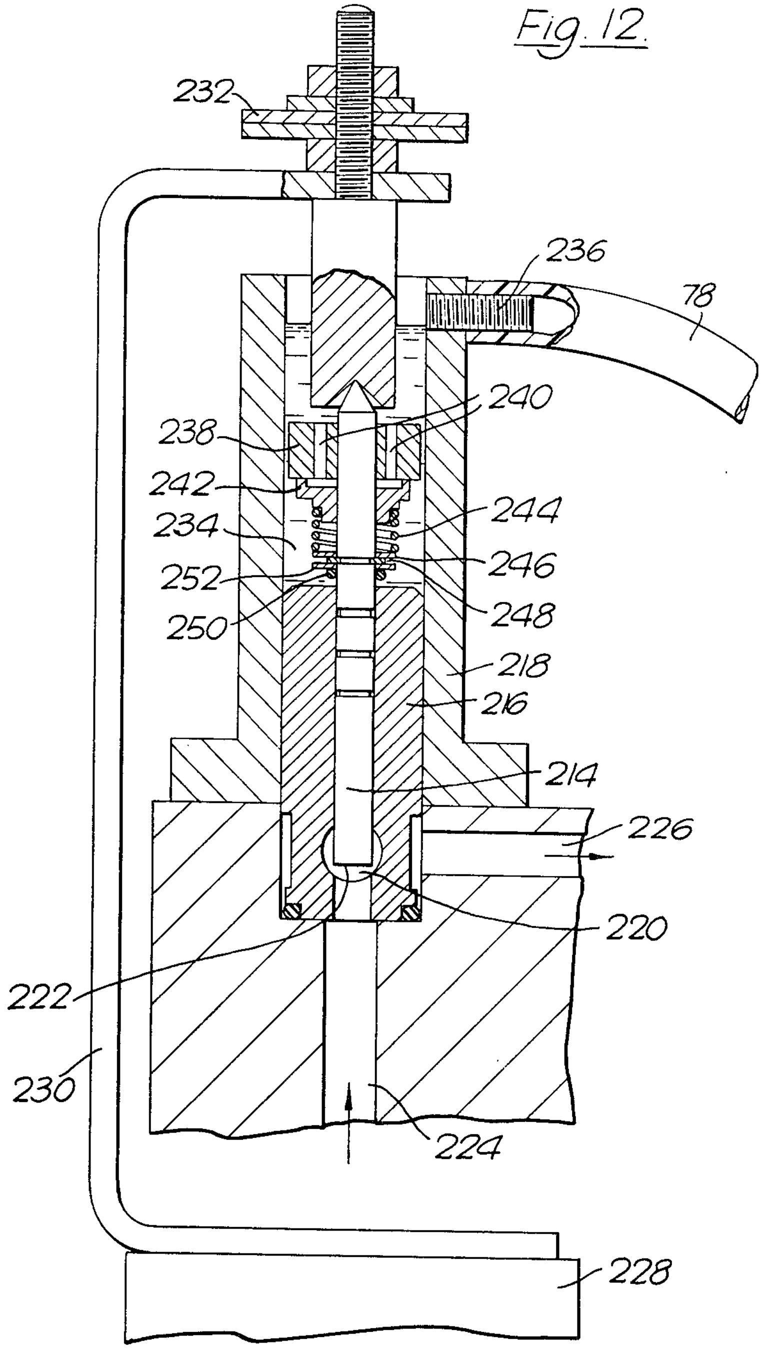
FIG. 12 is an enlarged vertical section through one of three deadweight valves shown in FIG. 1.

The deadweight valve shown in FIG. 12 comprises a hardened and ground steel plunger 214 located in a honed bore in a plunger barrel 216. The plunger is free to move up and down in the barrel which is a press fit in the honed bore of a dashpot 218. In the lower portion of the plunger barrel, the vertical 6 mm diameter plunger bore forms an intersection with a horizontal 10 mm diameter hole 220. The bottom 222 of the plunger 214 is flat and shuts off the intersection of the who holes when in its lowest position.

Fuel oil enters the barrel 216 through an inlet passage 224 and is prevented from escaping through the cross hole 220 by the plunger 214. Pressure builds up under the plunger until it is lifted sufficiently to allow oil to escape to the outlet passage 226. The pressure at which the valve operates i.e., the pressure in the outlet passage 226, in controlled by the size of a weight 228 which is supported by the top of the plunger 214 and a hanger bracket 230. Fine adjustment of the pressure is achieved by the addition or subtraction of trim weights 232 on top of the hanger bracket 230.

The pressure of the oil at the base of the plunger 214 is greater than atmospheric pressure. This causes a small leakage flow past the plunger into the dashpot space 234 above the barrel 216. An overflow outlet 236 prevents oil from spilling over the top of the dashpot. In this way the dashpot is kept full of oil and any air that may be present is purged from the system.

A piston 238 is located at the top of the plunger 214 which means that oil has to be displaced from below to above the piston (or vice versa) for movement of the plunger 214 to occur. In normal operation the oil has to travel between the outside diameter of the piston and the wall of the dashpot. The clearance which exists between the piston and dashpot is chosen to give that optimum value of damping which eliminates resonance of the plunger 214 in the barrel 216 but still allows the valve to respond quickly to changes in the oil flow rate from the passage 224 to the passage 226.

There are four holes 240 through the piston (of which two are shown in FIG. 12). These holes are normally closed off by a valve plate 242 which is held against the underside of the piston 238 by a spring 244 which, in turn, is compressed by a washer 246 and a circlip 248. When the pump 50 is first switched on the build-up of pressure in the passage 224 is very rapid and the damping caused by the piston 238 is too great to allow the plunger to rise quickly enough. As the force on the plunger 214 increases, the rate of lift increases until there is sufficient pressure difference across the piston 238 to unseat the valve plate 242. When this occurs the oil which is above the piston 238 no longer has to pass between the piston and dashpot but bypasses through the holes 240 in the piston. This allows the plunger 214 to rise rapidly and prevents a build-up of pressure upstream of the valve which could burst the nylon pipe 56 between the pump 50 and the valve.

When there is no flow between the passage 224 and the passage 226, the force exerted by the weight 228 causes the plunger 214 to be supported by an '0' ring 250 and a washer 252 bearing against the top of the barrel 216. This prevents any of the oil in the dashpot from draining back into the system and leaves it primed ready for the apparatus to be restarted.

The three deadweight piston valves 62, 64 and 66 shown in FIG. 1 provided with different weight settings to provide, on their upstream sides, fuel at different pressures. Thus, for example, the three valves 62, 64 and 66 can be set to control fuel pressure to 120 psi, 74 psi and 20 psi respectively, it being understood that these pressures are typical only and may be widely varied in use of the apparatus. A pressure select valve 68 is connected to the upstream sides of the two valves 64 and 66 to enable oil at either 74 or 20 psi to enter a pipe-line 70 which leads to a rotary control valve 72. The upstream side of the other weighted valve 62 is likewise connected to the valve 72 but through a pipe-line 74 which contains a plenum chamber 76 serving to absorb the pressure demands of the injector 10. Each weighted valve has a leakage line 78 leading from its overflow outlet 236 to a collecting funnel 80. From here all overflow fuel is returned by a line 82 to the fuel tank 48.

Other parts of the apparatus will be introduced in the following description of the manner in which an injector is tested on the apparatus.

Figure 7:
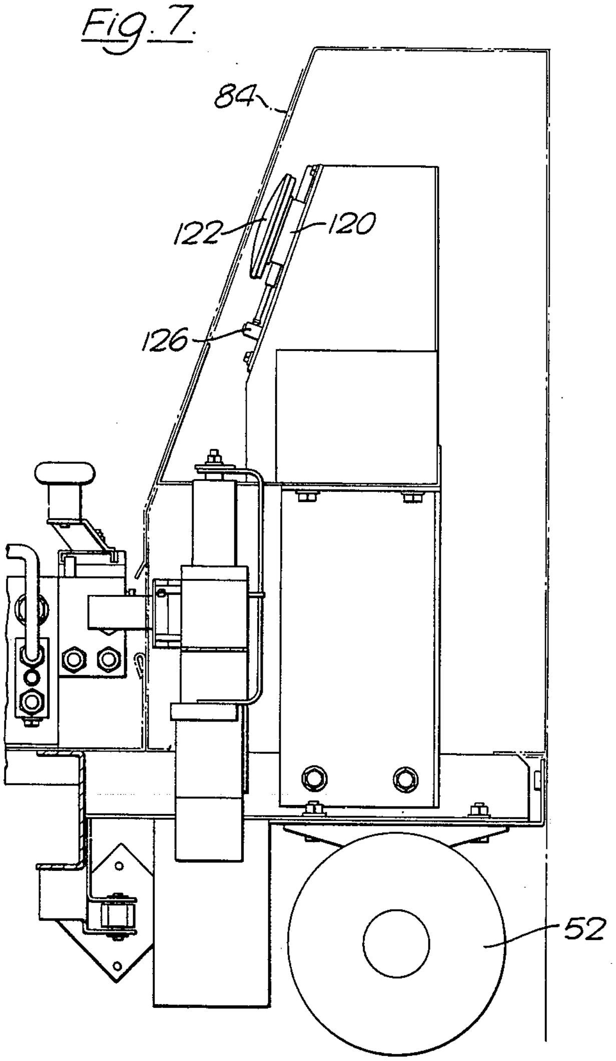
FIG. 7 is a view of the other end of the said main parts.
Figure 8:
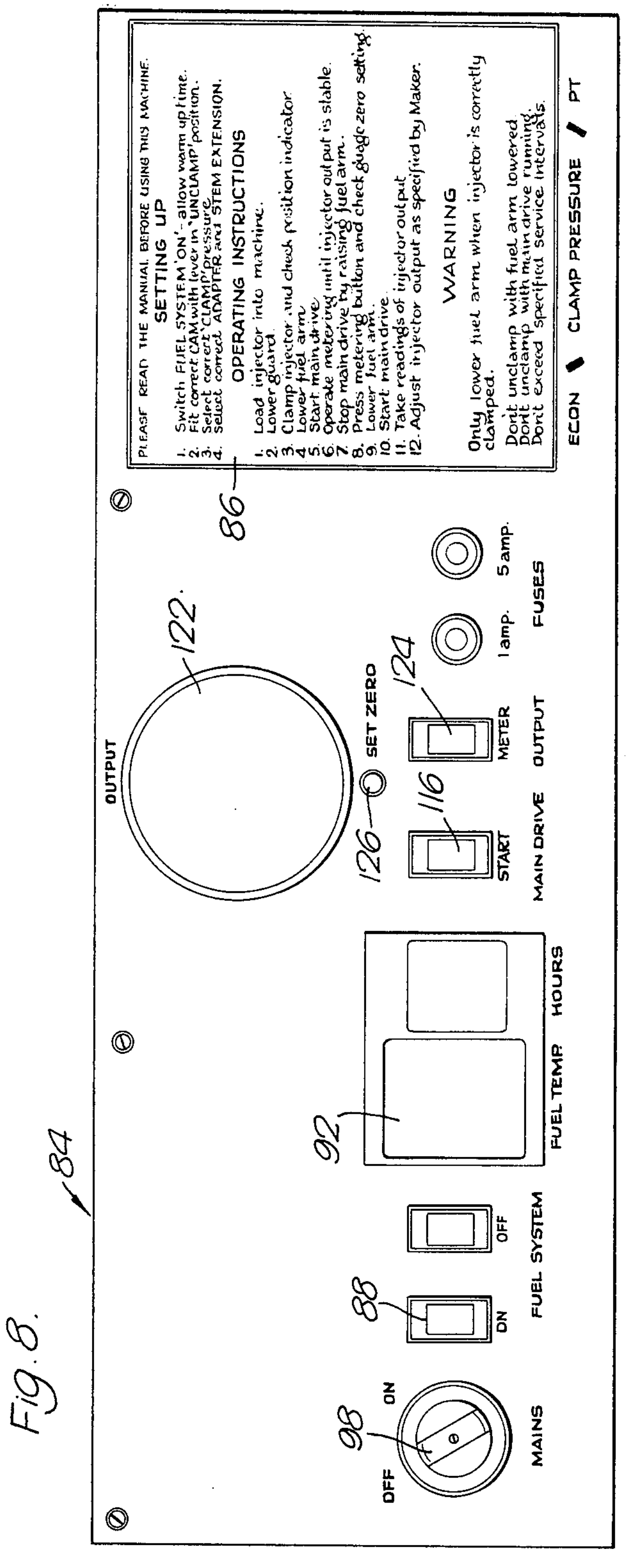
FIG. 8 is a view of a panel on the front of the apparatus.

FIG. 8 illustrates a panel 84 which is normally mounted on the front of the apparatus (see FIGS. 6 and 7) and which conceals certain parts of the equipment shown in the other Figures. On this panel are various switches and meters, as well as a list 86 of operating instructions. By following this list of instructions, we shall readily see how the apparatus operates.

The first four instruction concern "setting up" the apparatus. A fuel system "on" switch 88 on the panel 84 is operated after an electric switch 90 has been switched on to supply mains electricity to the apparatus. Operation of the switch 88 causes the electric motor 52 to drive the gear pump 50 which thus delivers fuel in cascade through the three valves 62, 64 and 66 and thence back to the tank 48 through return pipe 79. This circulation of the fuel is continued until the fuel is at the right temperature, for this is important if the accuracy of the test is to be ensured. To allow the fuel to be brought to the right temperature, the fuel tank 48 is provided with a thermostatically-controlled electric immersion heater (not shown), the temperature of the fuel being indicated by a meter 92 on the front panel 84.

Figure 2:
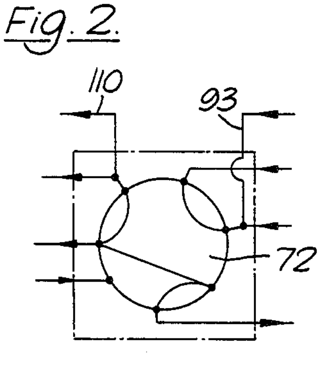
FIGS. 2 and 3 are further views of one of the valves shown in FIG. 1 to illustrate the different flow paths through the valve at different stages of the testing procedure.

The appropriate cam 18 for the injector to be tested is then fitted on the cam shaft 20. The fact that the cam is not permanently fitted on the cam shaft is an important feature of the invention, for it allows an infinite number of different cams to suit different injectors to be fitted on one and the same machine. The selected cam is fitted on the shaft 20 after the rotary valve 72 has been moved into the "unclamp" position shown in FIG. 2 where it supplies fuel via a line 93 to an hydraulic indexing cylinder 94. This cylinder has a piston 96 connected to a lever 98 having an indexing wheel 100 at its far end which, when fuel is fed to the cylinder 94, abuts against the periphery of the heart-shaped cam 104. The cam therefore rotates until roller 100 abuts a shoulder 102 formed in the periphery of cam 104 fast on the shaft 20. The shaft is, in this way, correctly indexed to an angular position where it is able to receive the selected cam. Shoulder 102 locks the shaft 20 firmly to permit removal of the cam locking nut 21. Ramp 103 has a slope such that, under the action of hydraulic pressure on the piston 96, it provides the correct torque at shaft 20 against which the nut 21 should be tightened.

The right annular adapter 12 and stem 14 for the injector are now chosen and fitted in position. Prior to fitting the correct stem and adapter, the pressure select valve 68 is put in the position appropriate for the particular injector to be tested.

Figure 10:
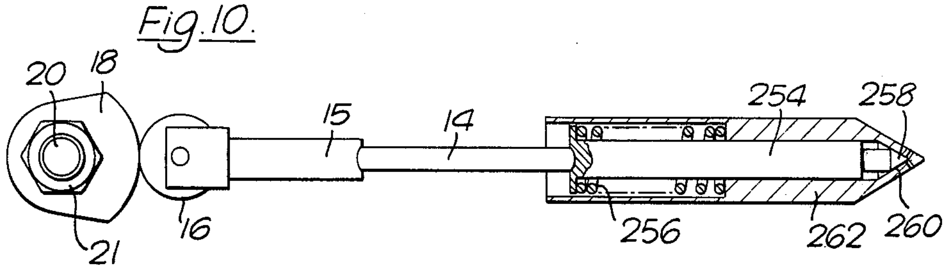
FIGS. 10 and 11 are enlarged part-sectional views illustrating the fitting of two basic types of injector on the apparatus.
Figure 11:
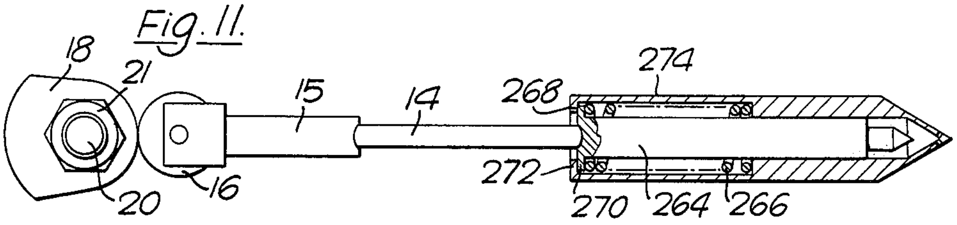

The index position of the cam 18 will vary according to which type of injector is to be tested. As shown in FIGS. 10 and 11, which illustrate the two basic types of injector, there are differences in their construction which call for a different index position of the respective cams 18. In the case of the injector shown in FIG. 10, the cam 18 has to be in its top dead centre position with the stem 14 pressing the injector plunger 254 to the right, against the action of the spring 256, so that the nose cone 258 of the plunger 254 engages the corresponding conical surface 260 of the injector casing 262 under a predetermined pressure. This applies to PT, PTB, PTC and PTD injectors. In the case of the injector shown in FIG. 11, however, the cam 18 has to be in its bottom dead centre position with the stem 14 acting on the plunger 264 under a lower predetermined pressure not exceeding the force of the spring 266. This applies to PTE (ECON) injectors.

It will therefore be seen that, in the fitting of an injector on the apparatus, the stem 14 acts as an axially-stationary positioning element. In the case of injectors of the type shown in FIG. 10, the datum location at the member 36 in such that the nose cone 258 of the injector plunger 254 bears against the corresponding conical surface 260 of the injector casing 262 with a predetermined pressure. In injectors of the type shown in FIG. 11, the datum location at the member 36 in such that the face 268 of the flange 270 on the injector plunger 264 bears against the opposing flange 272 of the injector casing 274 with a different predetermined pressure. Further, the length of the stem 14 is used to determine the axial position of the injector casing so that the fuel inlet 204 in the latter is precisely positioned to receive fuel from the valve 203 of the fuel arm 42. After the above setting-up procedure has been completed and the injector 10 loaded into the apparatus, a safety guard (not shown on the drawings) is lowered to protect the operator from injury.

Figure 3:
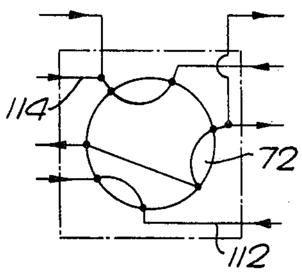

The rotary valve 72 is now turned to the "clamp" position shown in FIG. 3. This releases the indexing wheel 100 of the lever 98 from the periphery of the cam 104 by allowing fuel in the cylinder 94 to be exhausted therefrom through the line 93 which preferably contains a safety valve or other interlock 108 operated by the motor switch to ensure that fuel cannot flow back into the cylinder 94 during testing of an injector. At the same time, fuel is now supplied to the other side of the piston 96 in the cylinder 94 via a line 110 so as to move the indexing wheel 100 positively away from the cam 104.

Movement of the valve 72 into the "clamp" position also causes fuel to be supplied as hydraulic fluid to the cylinder 28 of the first clamp 26 via a line 112 and to the hollow piston 30 of that clamp through a line 114. This has the effect of securely clamping the injector in such a way that the nozzle end of the injector is clamped independently of the connection made between the cam 18, the stem 14 and the pump portion of the injector.

The fuel arm 42 is then lowered so that its delivery nose 44 makes sealing contact with the peripheral inlet on the injector. An interlock between the arm and a switch in the circuit of the motor 22 is also freed as a result of this downward movement of the arm so that the main drive can now be started by operating a button or switch 116 on the front panel 84. This starts the motor 22 which drives the cam shaft 20. The stem 14 is thereby reciprocated, with the result that fuel is pumped out of the injector, through its delivery nozzle, into a pipe line 118 which leads to a flow recorder 120 having a dial 122 on the front panel 84. The fuel received by the flow recorder 120 is exhausted to the collecting manifold 80, whence it drains back into the fuel tank 48. Directly the injector output is stable, as indicated by successive readings on the recorder dial 122, the main drive is stopped by raising the fuel arm 42, the arm being arranged to operate a switch which switches off current to the motor 22. A metering button 124 on the front panel 84 is then depressed and a check made that the dial 122 returns to zero, any adjustment necessary being made by turning the zero set screw or knob 126 on the front panel 84. The fuel arm 42 is now lowered again, the main drive is switched on again by pressing the button 116, readings are taken of the injector output on the dial 122, and any necessary adjustment made on the injector so that its output coincides with that intended by its manufacturer.

Release of the injector is effected after the fuel arm has been lifted to switch off current to the motor 22. By moving the rotary valve 72 to the "unclamp" position, the two hydraulic clamps are released through the line 126 to unclamp the injector 10.

A sub-divided spill tray 128 lies beneath the injector, the clamps and cambox. One division of the tray 128 serves to collect "drain" and "spill" oil from the injector and leakage from the clamps and return it to the tank via pipe 132. The other division of the tray 128 collects cambox leakage and tool tray drainage and drains it to waste container 130.

It will be seen from FIG. 1 that a pressure datum valve 134 is provided in the line 112 between the valve 72 and the cylinder 28. This valve is connected by a link 136 to a lever 138 having a follower wheel 140 which bears on the periphery of a subsidiary cam 142 on the shaft. This valve refers the pressure on clamp piston 26 back to the reference pressure set by the valve 64 or 66 (whichever is selected) for a small angular period each time the shaft 20 passes through the indexing position. This allows thermal expansion of the injector and the equipment to take place without the pressure changing on piston 26.

Figure 13:
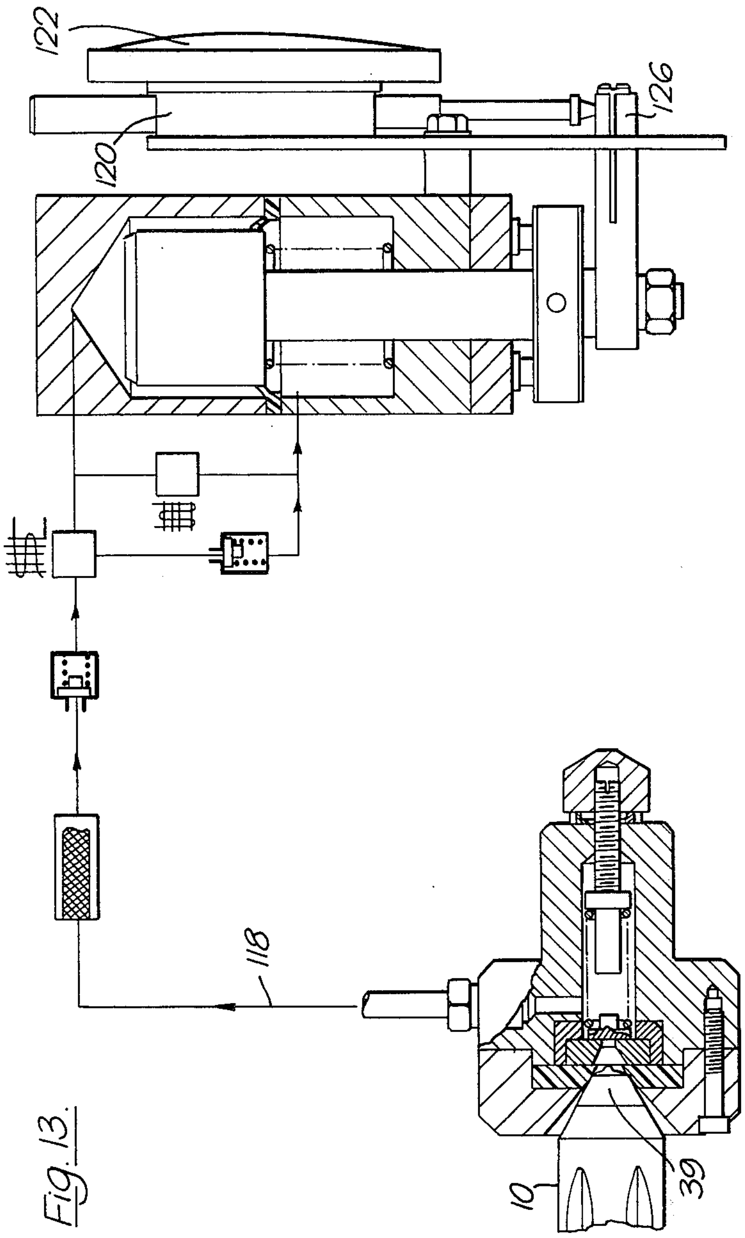
FIG. 13 is an enlarged sectional view through a nose cone assembly and a metering unit assembly forming part of the apparatus shown in FIG. 1.

Finally, FIG. 13 illustrates certain details of the nose cone assembly 38 and the metering unit assembly 120, 122 and 126. In particular, it will be seen that a replaceable annular nylon seal 276 is positioned in the assembly 38 to receive the nose of the injector 10, the seal 276 being replaceable without changing the valve 278 in the nose cone assembly or altering the pressure of the valve spring 280. Attention is also drawn to the fact that the pipe connection 118 between the nose cone assembly 38 and the metering unit assembly 120, 122 and 126 preferably comprises a stiff high-pressure pipe of nylon. The spring 280, incidentally, simulates pressure conditions prevailing in an engine cylinder with which the injector is designed to be used.

I claim:

1. Apparatus for testing fuel injectors having their own in-built high pressure pump, the said apparatus comprising: removable motion-transmitting means adapted to engage and actuate the high pressure pump of an injector to be tested on the apparatus, driving means comprising a cam-shaft and a motor driving said cam-shaft for imparting motion to said motion-transmitting means, a fuel-collecting nose assembly to receive the nozzle end of an injector to be tested, and an hydraulic clamp for engaging and thus clamping the nozzle end of the injector into the said fuel-collecting nose assembly, the said motion-transmitting means serving also as a positioning means for positioning an injector when the latter is fitted on the apparatus for testing.

2. Apparatus according to claim 1, in which the removable motion-transmitting means comprise a stem which actuates the pump of the injector on being reciprocated axially by a removable cam on the cam-shaft.

3. Apparatus according to claim 1, comprising a second hydraulic clamp which serves to bring the injector and the motion-transmitting means into their correct axial position with respect to the cam on the cam-shaft so that a fuel inlet on the injector is correctly positioned to receive fuel from a fuel-supply valve.

4. Apparatus according to claim 3, in which the length of the motion-transmitting means determines the axial position of the injector with respect to the cam on the cam-shaft.

5. Apparatus according to claim 3, in which a pressure datum valve is provided in an hydraulic supply line to the said second hydraulic clamp to compare the hydraulic pressure applied to the piston of the said second clamp with a predetermined reference pressure.

6. Apparatus according to claim 5, in which the pressure datum valve is connected by a link to a lever having a follower wheel bearing on the periphery of a third cam which is held fast on the cam-shaft.

7. Apparatus according to claim 1, comprising a platform member which carries a removable annular adapter suited to the particular injector to be tested on the apparatus and arranged to engage the injector.

8. Apparatus according to claim 7, in which the said platform member serves as the datum position for location of the injector on the apparatus.

9. Apparatus according to claim 1, in which cam-locating and indexing means are provided to hold the cam in a predetermined angular position to permit the injector to be correctly located on the apparatus.

10. Apparatus according to claim 9, in which the cam-locating and indexing means comprise an hydraulic indexing cylinder having a piston connected to a lever provided with an indexing wheel which abuts against a second cam which is held fast on the cam-shaft, the said second cam having an indexing shoulder formed in its peripheral surface.

11. Apparatus according to claim 10, in which the peripheral surface of the said second cam includes a ramp having a slope such that, when the hydraulic indexing cylinder acts on the said second cam through the said lever and indexing wheel, it provides the correct torque at the cam-shaft against which a nut securing the removable cam should be tightened.

12. Apparatus according to claim 10, in which the supply of hydraulic fluid to the hydraulic indexing cylinder is controlled by an interlock device to ensure that hydraulic fluid cannot flow back into the said cylinder during actual testing of an injector on the apparatus.

* * * * *